Patented Aug. 6, 1935

2,010,655

UNITED STATES PATENT OFFICE 2,010,655

ADSORBENT

Herbert J. Wollner, Brooklyn, N. Y., and George E. Taylor, Westfield, N. J., assignors to General Chemical Company, New York, N. Y., a corporation of New York No Drawing. Application November 1, 1932, Serial No. 640,664

10 Claims. (Cl. 252—2)

This invention relates to a silicious adsorbent, and to the method of producing the same. The invention is particularly directed to a process for preparing from clays and silicious materials an active silica for use in purifying, filtering, bleaching and decolorizing oils, solutions and gases.

Several processes for making active earths and various decolorizing and purifying agents have been proposed. Such substances previously employed in the arts may generally be considered as falling within one of two broad classes. The first of these includes earths which are found in their natural state in such condition as to be substantially ready for use. Fuller's earth and bauxite are two well known examples of this type of material. A second generic class, which may be regarded broadly as directed to artificial substances, includes acid treated clays, and gels of various kinds generated, as a rule, by processes involving reactions between soluble silicates and acids. Of the acid treated clays, well known substances resulting from acid treatment of bentonite and montmorillonite are representative, and gels, such as silica gel, are examples of the second type. There is a wide difference between the substances of each broad class both with respect to initial cost of manufacture and their efficiency as decolorizing and purifying agents.

A process has been proposed by which the field of raw materials serving as a source of the silica in the finished product has been broadened to include the utilization of clays and silicious materials of different characater than theretofore employed, and which provides for the use of clays having little or no original adsorbent or purifying properties in untreated condition as a source of silica for the improved product. Further, such proposal aims to provide a process by which a superior product can be made from silicious materials constituting the tailings or waste of chemical processes involving the treatment of clays and related silicates and other mineral substances containing substantial amounts of silica and in which processes the silica content is partially or wholly an unsought for constituent.

The prior process may be briefly described as follows: Where the silicious material employed is in the raw condition, e. g. substantially in the original form as mined as a metal silicate, the material is preferably initially dried, crushed and calcined. Following calcination, the material is digestive in a strong mineral acid, and the acid-soluble constituents then separated from the silicious residue by washing. The silicious residue thus obtained is digested with the aid of heat in an alkaline solution in which the silica forming the active component of the adsorbent product becomes dissolved. Solid undissolved residues are separated from the hot solution, and the active silica is subsequently precipitated from the alkaline solution. The adsorbent thus formed is separated from the solution, and suitably dried. In instances where the silicious material employed is the by-product of a chemical process involving the acid treatment of a silicate and in which acid soluble substances have been separated and removed from the silica, the silicious by-product is directly subjected to digestion in the alkaline solution and to the subsequent treatment, the acid treatment being omitted provided the prior chemical process has been such that the silicious product or by-product thereof is in suitable physical condition for the alkaline digestion.

One phase of the prior process, as usually practiced, includes a filtration operation immediately following the digestion of the silicious material in the alkaline solution for the purpose of separating undissolved solid residues, mostly insoluble silicates, from the solution prior to the precipitation therefrom of the active silica. When operating in accordance with the prior process with some silicious materials to provide the necessary source of silica, it appears that under certain conditions, if residues undissolved by the alkaline digestion are permitted to remain in the solution during precipitation therefrom of active silica, the purifying and decolorizing properties of the active silica product may, in some instances, be impaired. It is to the elimination of this filtration or separation operation that the present invention relates.

The investigations from which the present invention was developed seem to indicate that deleterious effects of undissolved silicious residue on the decolorizing and purifying properties of the active silica precipitated from the alkaline solution may be because of small quantities of organic matter contained in the silicious material initially employed. The present invention includes as a part thereof the discovery that the filtration step may be avoided, and where in accordance with the preferred embodiment of the invention, organic matter contained in silicious material is removed therefrom, as for example by calcination, prior to the digestion of the silicious material in the alkaline solution, or where the raw silicious material is of such character that, just prior to the digestion stage, it contains substantially no organic matter, active silica may be precipitated from the alkaline solution in the presence of the undissolved silicious residue in the solution, and a final product formed which embodies the precipitated silica combined with the solid silicious residues of the alkaline digestion. Hence, the preferred embodiment of the present invention includes an oxidation or calcination step prior to the alkaline digestion, and the precipitation of active silica from the alkaline solution in the presence of undissolved silicious residue of the alkaline digestion to form an active adsorbent comprising the precipitated silica and the undissolved silicious residues. The product thus obtained is separated from the solution, and suitably dried.

One preferred mode of carrying out the present invention utilizing for illustrative purposes specific raw materials and operating conditions is as follows:

The raw material employed may be a flint clay, substantially kaolinite, and of approximately the following composition:

|  | Per cent |
| --- | --- |
| Alumina ($Al_2O_3$) | 40 |
| Silica ($SiO_2$) | 45 |
| Water ($H_2O$) | 13 |
| Titania, iron oxides, alkalies, etc. | Balance |

The clay is dried, crushed to a suitable degree of fineness, and then calcined at a temperature of approximately 650° C. Following calcination, the clay is cooled and ground. The finely ground calcined clay may then be digested with 40% sulfuric acid for a period sufficient to facilitate the dissolution by the acid of substantially all the readily acid soluble substances. In the particular instance, a large proportion of alumina is liberated, taking the form of aluminum sulfate. To facilitate settling and separation of the solid residue from the aluminum sulfate solution, a small quantity of a suitable coagulant, specifically glue, may be introduced into the digest solution as is customary in settling operations of this kind. The aluminum sulfate and other acid soluble substances are then removed from the acid-treated clay by washing with water. After washing and drying the silicious clay residue remaining may analyze substantially as follows:

|  | Per cent |
| --- | --- |
| Silica ($SiO_2$) | 70 |
| Alumina ($Al_2O_3$) | 14 |
| Titania, iron oxides, ignition loss, etc. | Balance |

According to the present invention, the silicious clay residue is now calcined with frequent rabbling, at a temperature of about 600-625° C. for about an hour to oxidize and remove from the clay residue organic substances which were included therein. The calcined clay residue is then ground to such an extent that substantially all of the material passes a 300 mesh screen. A mixture comprising one part of ground calcined clay residue to four parts of sodium carbonate in the form of a 20% solution, i. e., 4 parts of sodium carbonate to 16 parts of water, is boiled for about one hour. During the digestion, silica forming one active component of the adsorbent becomes dissolved in the sodium carbonate solution. On completion of the boiling for the period noted, approximately 50% by weight of the original clay residue may be found undissolved.

The solution remaining after digestion while in the hot state apparently contains sodium silicate, sodium bicarbonate and sodium carbonate, some carbon dioxide having been given off during digestion. The solution is then cooled to normal temperature without filtering off the solid residues undissolved by the alkaline digestion. During cooling, active silica, dissolved in the solution, precipitates out of the solution as a light colored flocculent gel in the presence of and upon the undissolved residues, forming therewith a highly activated mass. To promote admixture of the silica precipitated from solution and the undissolved solids, the mass may be suitably agitated during precipitation of the silica from solution. After adding to the solution sufficient carbon dioxide to compensate for that given off during digestion, and then permitting the solution to stand for some time, for example about one hour, to further complete precipitation of the silica from solution, the mass is filtered to effect separation of the adsorbent from the solution. The filtered active product may then be subjected to washing with water to remove sodium carbonate. Subsequently, the adsorbent may again be washed with a weak acid to neutralize any sodium carbonate which may have been left behind. The adsorbent thus obtained may be dried at a temperature of about 110° C. for approximately one hour and subsequently ground to sizes suitable for decolorizing and purifying purposes.

In the initial acid digestion, any suitable acid such as sulfuric, hydrochloric, or nitric acid or any acid strong enough to effect the removal of alumina may be employed.

Calcination of the original raw silicious material prior to acid digestion while not essential is preferable to aid in the dissolution of the raw material. However, this initial calcination should not be confused with the calcination or oxidation step just prior to the digestion of the clay residue of the acid digestion in the alkaline solution. The final calcination has a function separate and distinct from the initial calcination prior to the acid digestion, in that the second calcination acts to substantially completely eliminate from the silicious material organic material which may have originated in the raw silicious material or may have its source in the organic coagulants employed to facilitate settling after the acid digestion or other organic material which may have worked into the batch during processing, for example in the form of oily drips from the machinery. The duration of the final calcination may vary from a few minutes to something over an hour. Likewise, the temperature of the calcination operation may vary from about 300° C., usually in excess of 400° C., to approximately 750° C. As set forth in the above example, calcination temperatures of about 600-625° C. are preferred, and as a rule, this temperature should not exceed about 750° C. Temperatures in excess of this are not generally desirable since a decrease in the amount of silica passing into solution on digestion appears to result. Accordingly, excessively high temperatures are not particularly desirable.

The concentration of the sodium carbonate solution may be varied over a considerable range. It appears that dissolution of the active silica is more complete in a relatively concentrated solution, although such concentration may vary from less than 10 to about 24%. A potassium carbonate solution or a solution comprising a mixture of sodium and potassium carbonates of suitable concentration may be employed.

The solution obtained on the digestion with the carbonate apparently contains principally, while hot, sodium silicate ($Na_2SiO_3$), sodium bicarbonate ($NaHCO_3$), and sodium carbonate ($Na_2CO_3$). The digestion reaction may be explained on the basis that the sodium carbonate reacts with the silica of the clay residue forming sodium silicate and sodium bicarbonate. The latter in the process of boiling incurs a small loss of carbon dioxide as previously noted. Upon cooling the solution, the silica of the sodium silicate precipitates reforming sodium carbonate in the solution.

In practice, the carbonate digestion may be carried out under such conditions that the carbon dioxide evolved is drawn off and conserved to be turned back into the carbonate solution, either before or after cooling. In accordance with the present invention the latter procedure is preferred. During cooling, the major portion of the silica, upwards of about 90%, is precipitated, and substantially all of the silica remaining in solution is precipitated on the addition of the carbon dioxide. In order to determine the carbon dioxide loss during digestion, a sample of the hot filtered carbonate solution is tested on cooling for the presence of sodium silicate, and the carbon dioxide necessary to facilitate complete precipitation of the silica therefrom is determined. The required amount of carbon dioxide is added to the cool carbonate solution as carbon dioxide gas, or in the form of sodium bicarbonate in sufficient quantities to furnish the necessary amount of carbon dioxide. In whatever form the carbon dioxide is added, the quantity thereof should preferably be sufficient to compensate for that lost during digestion, or in other words, the amount of carbon dioxide added should preferably be enough to convert the solution back to a sodium oxide to carbon dioxide molecular ratio of one to one.

As will be observed from a consideration of the above specific example of the operation of the process, the filtration step between the termination of the digestion period and the precipitation of active silica from the hot alkaline solution is eliminated in the present process, since the precipitation of active silica from the alkaline digest solution is effected in the presence of the solid residues which have remained undissolved by the action of the alkaline solution. In situations where the raw silicious material is of such character that it is substantially free from organic matter prior to digestion, the operation of removing organic matter from the silicious material, as by calcination, is unnecessary. In still other instances where, because of the particular use for which the adsorbent is intended, the presence of small amounts of organic matter is immaterial, calcination prior to digestion is not essential. The result, however, of procedure in accordance with the invention is that the solid undissolved residues of the alkaline digestion may be employed as material for association with and as a base for the highly active silica precipitated from the alkaline solution on cooling. Outstanding advantages of the invention are the elimination of one filtration operation, and the increasing of the bulk of the final product to a material extent without decreasing its activity.

After the filtration and removal of the activated product from the solution, the latter, which has been substantially all transformed back to sodium carbonate on the replacement of carbon dioxide, is returned to the process and utilized in a subsequent carbonate digestion.

The adsorbent, after filtration, is subjected to one or more water washes to remove excess of sodium carbonate, and the wash water is likewise returned to the process. Following the water wash, the product may be washed with a weak acid to neutralize any sodium carbonate which may be retained after the water washing. The washed product is then dried at a temperature of about 110° C. for approximately one hour and ground to suitable degree of fineness to facilitate use of the product for decolorizing and purifying purposes.

In the specific example given above, it will be observed that the raw material employed was a clay having the characteristics and approximate composition of kaolinite. The process is particularly adaptable to make use of many different clay materials of this general type and other silicious materials, and contemplates the employment of materials which in either the raw or acid treated state may have little or no adsorbent and purifying properties, and mineral substances which primarily or when subjected to an acid treatment may have some more or less valuable properties as adsorbents and purifying agents.

The carbonate digestion and subsequent phases of the process are adaptable to the treatment of silicious residues of prior chemical treatments which serve to place the silicious material in similar chemical and physical condition as that acquired by residues resulting from the acid treatment of clays and similar silicates. It is in connection with the utilization of the silicious residues of other chemical treatments that the present invention is of particular value. Several chemical processes, from which a silicious by-product suitable for use as a source of silica is obtained, often involve the employment of organic substances for example, the use of glue as a coagulant in the manufacture of aluminum sulfate, with the result that organic matter is usually contained in the silicious residues. Such residues when calcined prior to the alkaline digestion may be utilized in the present process as a source of silicious material for the final product. Whatever the source of the silicious material, the invention, in the preferred embodiment, contemplates oxidation of the organic matter contained in the silicious material prior to the digestion of the latter in the alkaline solution, followed by the precipitation of active silica from the solution in the presence of the solid undissolved residue of the alkaline digestion operation.

We claim:

1. The method of preparing a silicious adsorbent which comprises treating silicious material with acid, removing organic substances from the acid treated material, digesting the material in an alkaline solution, precipitating silica from the solution in the presence of substantially all of the undissolved silicious material contained in the digest solution, and separating the solid product from the solution.

2. The method of preparing a silicious adsorbent which comprises digesting silicious material in an acid solution, separating the solid residue from the acid soluble substances, removing organic material from the residue, digesting the residue in an alkaline solution, and precipitating silica from the solution in the presence of substantially all of the undissolved residue contained in the alkaline digest solution.

3. The method of preparing a silicious adsorbent which comprises digesting acid treated silicious material in a hot alkaline solution, cooling the solution in the presence of substantially all of the undissolved residue contained in the digest solution to form a silicious precipitate, and separating the product from the solution.

4. The method of preparing a silicious adsorbent which comprises digesting calcined clay in a strong mineral acid solution, separating the silicious residue from the acid soluble substances by washing with water, calcining the residue at a temperature in excess of 400° C., digesting the calcined residue in a hot sodium carbonate solution, cooling the solution in the presence of undissolved residue to form a silicious precipitate, treating the solution with carbon dioxide to substantially completely precipitate silica from the solution, separating the solid product from the solution, and reusing the solution for digestion of other quantities of silicious material.

5. The method of preparing a silicious adsorbent which comprises calcining silicious material containing organic matter at temperatures not exceeding about 750° C., digesting the freshly calcined silicious material in a hot sodium carbonate solution, cooling the solution in the presence of undissolved silicious material to precipitate silica, treating the solution with carbon dioxide in an amount such that the ratio of carbon dioxide to sodium oxide in the solution will be not substantially less than one to one to substantially completely precipitate silica from solution, and separating the solid product from solution.

6. The method of preparing a silicious adsorbent which comprises treating silicious material with acid, calcining the acid treated material containing organic matter at temperatures not exceeding 750° C. to remove organic matter therefrom, digesting the material in a hot alkaline solution, precipitating silica from the solution in the presence of undissolved residue, and separating the silica from the solution.

7. The method of preparing a silicious adsorbent which comprises digesting silicious material in an acid solution, separating the solid residue from the acid soluble substances, calcining the residue containing organic matter at temperatures not exceeding about 750° C. to remove organic matter therefrom, digesting the residue in an alkaline solution, and cooling the solution in the presence of undissolved residue to precipitate silica from the solution.

8. The method of preparing a silicious adsorbent which comprises digesting silicious material in an acid solution, separating the solid residue from the acid soluble substances, calcining the residue containing organic matter at temperatures not exceeding about 750° C. to remove organic matter therefrom, digesting the calcined residue in a hot alkaline solution, cooling the hot solution in the presence of undissolved residue to form a silicious precipitate, separating the silica from the solution, and reusing the solution for digesting further quantities of silicious material.

9. The method of preparing a silicious adsorbent which comprises digesting calcined clay in a strong mineral acid solution, separating the silicious residue from the acid soluble substances by washing with water, calcining the residue at a temperature in excess of 400° C., and not exceeding about 750° C., digesting the calcined residue in a hot sodium carbonate solution, cooling the solution in the presence of undissolved residue to form a silicious precipitate, treating the solution with carbon dioxide to substantially completely precipitate silica from the solution, separating the solid product from the solution, and reusing the solution for digestion of other quantities of silicious material.

10. The method of preparing a silicious adsorbent which comprises calcining silicious material containing organic matter at temperatures not exceeding about 750° C. to remove organic matter therefrom, digesting the material in a hot alkaline solution, precipitating silica from the solution in the presence of undissolved residue, and separating the solid product from the solution.

HERBERT J. WOLLNER.
GEO. E. TAYLOR.